United States Patent [19]

Russell

[11] 4,454,513

[45] Jun. 12, 1984

[54] SIMULATION OF AN ELECTRONIC COUNTERMEASURE TECHNIQUE

[75] Inventor: John W. Russell, Xenia, Ohio

[73] Assignee: The United States of America as represented by the Secretary of the Air Force, Washington, D.C.

[21] Appl. No.: 287,451

[22] Filed: Jul. 27, 1981

[51] Int. Cl.³ .............................................. G01S 7/36
[52] U.S. Cl. .................................. 343/18 E; 343/17.7
[58] Field of Search ................. 343/17.7, 18 E; 434/2

[56] References Cited

U.S. PATENT DOCUMENTS 3,982,244 9/1976 Ward et al. ........................ 343/16 M
4,159,478 6/1979 Jaklitsch et al. .................... 343/18 E Primary Examiner—S. C. Buczinski
Assistant Examiner—M. R. Gordon Attorney, Agent, or Firm—Donald J. Singer; Bernard E. Franz

[57] ABSTRACT

An apparatus for use in evaluating the effectiveness of an ECM technique, such as the Cross Eye technique, which transmits RF signals from spatially separated antennas against a hostile radar system, such as a monopulse radar. The invention splits the radar transmit RF signal into separate paths, applies the ECM signal, and calibrates the combined radar-ECM signal for phase and amplitude balance after every pulse repitition interval. The signal is down converted to an intermediate frequency where a radar receive antenna is simulated. Following the antenna, an injection network up converts the frequency of the signal and adds computer controlled inputs (including echoes) prior to sending it to the radar receiver for final processing.

4 Claims, 12 Drawing Figures

BASIC GEOMETRY

CORRECTIONS

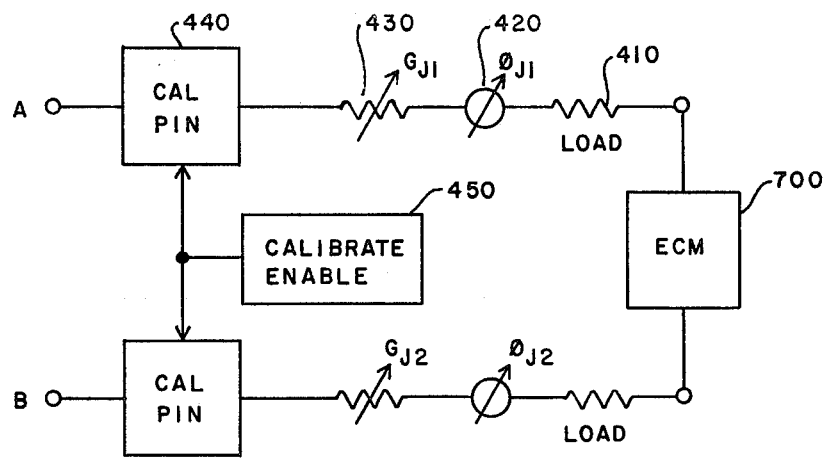
*Fig. 4*   ECM INTERFACE
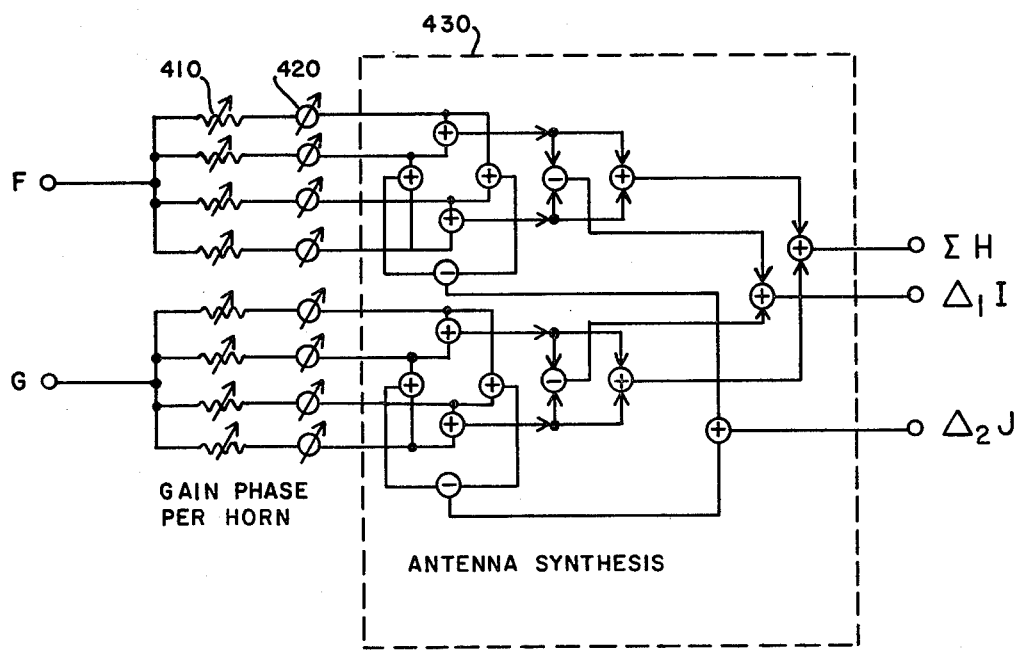
*Fig. 8*   ANTENNA SYNTHESIS

SIMULATED RADAR TRANSMITTER

INJECTION NETWORK

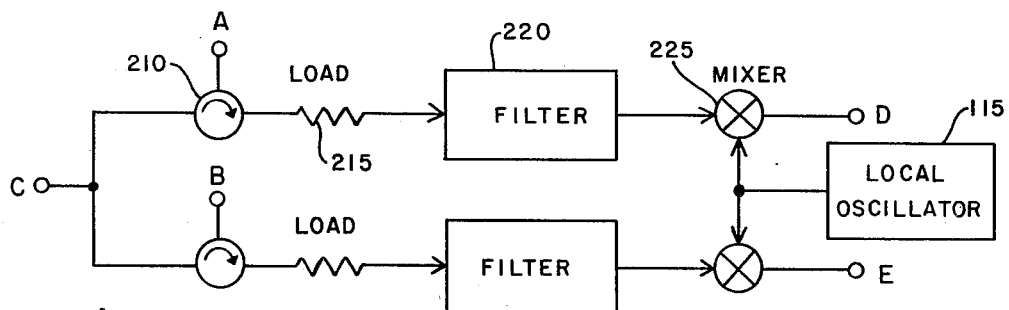
_Fig. 6A_
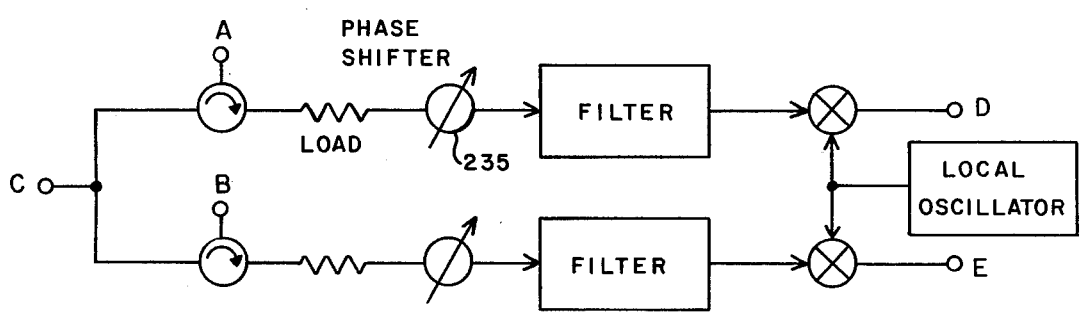
_Fig. 6B_
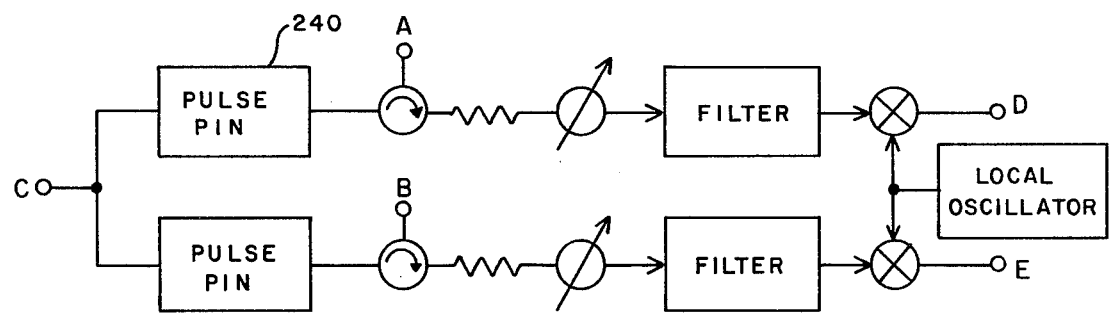
_Fig. 6C_

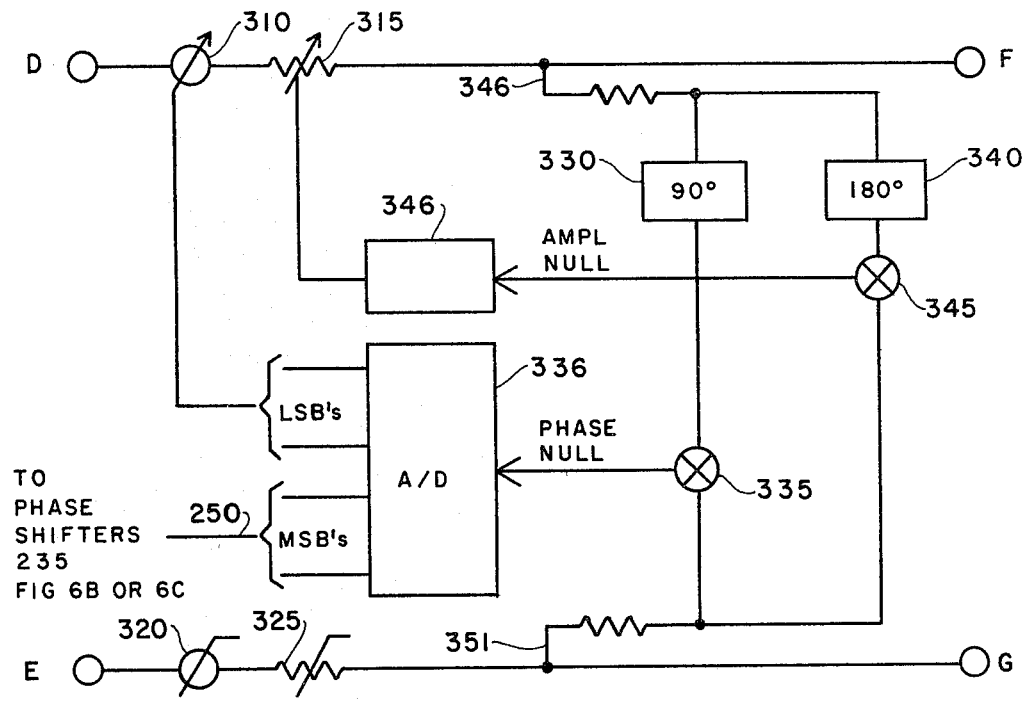
Fig. 7A  TYPICAL CALIBRATION APPROACH
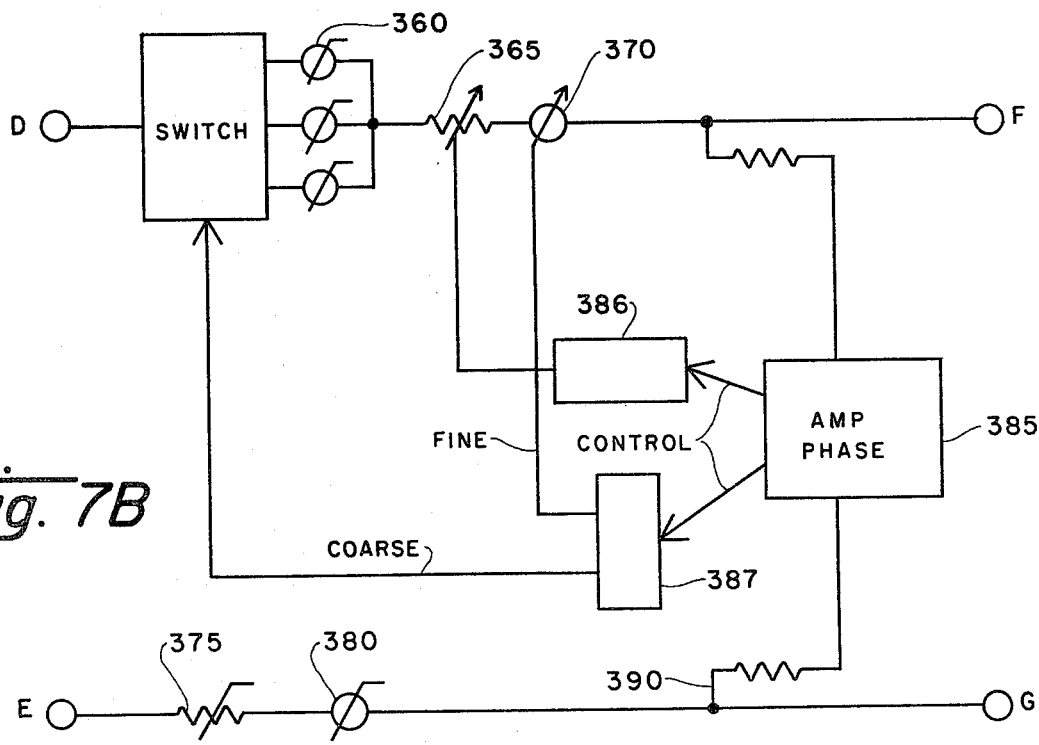
Fig. 7B  REFINED INITIAL APPROACH

SIMULATION OF AN ELECTRONIC COUNTERMEASURE TECHNIQUE

RIGHTS OF THE GOVERNMENT

The invention described herein may be manufactured and used by or for the Government of the United States for all governmental purposes without the payment of any royalty.

BACKGROUND OF THE INVENTION

The field of the present invention is in the radar system simulation art and more particularly that of radar system simulations employing electronic countermeasure jamming techniques.

The use of electronic countermeasure (ECM) systems for jamming radar systems is well known. The effectiveness of the ECM equipment depends, to a large extent, upon a knowledge of the operational characteristics of the radar that the jammer is designed to defeat. In order to evaluate the effectiveness of the ECM, current state-of-the-art methods employ a real-time computer controlled radar simulator. Some such simulators utilize an anechoic chamber while others can function effectively without a chamber. See, for example, U.S. Pat. No. 3,982,244. Occasionally, an ECM technique is devised that requires such precise amplitude and phase control of the microwave signals that these new tolerance demands exceed the relatively coarse accuracy capabilities of the simulation systems. An example of such is the Cross Eye ECM Technique.

The Cross Eye jamming technique works on the interferometer principle. In its simplest, conceptual definition, the technique requires radiation from one source through two physically separated antennas on an aircraft (usually at the ends of the wings). If the amplitudes of the radiated signals are nearly equal, deep interferometer nulls will be formed. If phase is precisely controlled, the position of the nulls can be positioned wherever desired. The intent of the Cross Eye technique is to position a null on half of a radar antenna and provide a residual of energy on the other half (see FIG. 1). This, in turn, creates a tracking error within the radar. Should the radar use phase comparison to develop tracking information, the technique remains viable because the radiated phase front in the region of the interferometer nulls shifts radically.

Previously, the evaluation of this technique was accomplished through flight testing. However, implementation of flight testing has been found to be expensive and extremely difficult because (a) deep interferometer nulls must be formed and (b) the null positioning must be precise, thereby requiring flight profiles that are difficult to maintain. When the two signal sources have a 180° phase difference, the deep nulls will result in the jamming energy nearly cancelling each other on the side of the radar receive antenna that generates a tracking error. This, in turn, means that high jammer powers are required. In addition, the radiated signals must be very close in amplitude. The precise null positioning requires precise phase control.

The specific point of a 180° relative phase difference of the two signals represents a mathematical singularity. Under such conditions, the null is directly on the center of an antenna and no tracking error is generated. The radiated signals effectively cancel to the extent that the amplitudes are the same. This singularity is important because it rules out the use of a single ECM antenna with cancellation internal to the jammer. Laboratory simulation in an anechoic chamber cannot be accomplished for two reasons. The first is that the scaling of distance places the ECM antennas on top of each other if realism is to be retained. The second is that the equipment in the chamber must transmit and receive at the same time. To accomplish this, two physically separated antennas are required to obtain adequate isolation. Unfortunately, the ECM hardware places its jamming null on the transmit antenna and not on the desired receive antenna.

Any simulation of the Cross Eye or similar technique would have to consider the conditions likely to cause problems, such as glint, thermal expansion, and devices that cause phase shifts. Mathematical formulas for basic Cross Eye technique requirements can be extracted from discussions of radar glint. These glint equations lead to simulator requirements in the neighborhood of ±0.1° relative phase accuracy and ±0.1 db relative amplitude accuracy to be simulated at actual radar frequencies. Depending upon an aircraft's location relative to the radar, a phase accuracy of ±0.1 db relative amplitude accuracy might be considered marginal. For design purposes, however, a ±0.1° phase accuracy and a ±0.1 db amplitude accuracy are sufficient to identify the simulation constraints.

Thermal expansion and vibration do cause serious simulation constraints. The phase shift $\phi$ caused by a differential length l is:

$$\phi = 360° \, (fl/c)$$

where c is the velocity of light and f is the frequency. The differential length of a 0.1° phase shift at 10 Ghz is found to be 8.3 microns. Unless phase is recalibrated at rapid intervals, thermal expansion will prevent simulation. If recalibration occurs only once every 100 seconds, the thermal expansion rate must be kept below 0.083 microns/second. If recalibration occurs once every millisecond (i.e., nominally once per radar pulse), then the allowable rate is 8.3 millimeters/second. Vibration causes similar problems although the mechanism is the addition of effective capacitances and/or inductances in the microwave circuits. Care must be taken to limit the amount of vibration and rate of vibration between recalibration of phase.

Devices that influence signal levels, such as PIN diode modulators, also cause phase shifts. This occurs because of stray capacitances and inductances. Such effects are greatly magnified due to the microwave frequencies involved.

Active components such as Traveling Wave Tubes (TWTs) can cause phase shifts as a result of minor power supply variation. In addition, devices other than passive linear components generally introduce a relatively large phase shift whenever operated over a wide dynamic range.

From the above discussion, it is apparent that any simulation of the Cross Eye or similar technique would require (a) rapid phase and amplitude recalibration, (b) minimal use of active components, (c) immediate down conversion to an intermediate frequency in order to provide adequate components (i.e., the effects of stray capacitances and inductances can be reduced significantly), and (d) the restriction of the dynamic range applied to critical components.

It is also necessary to synthesize portions of the antenna pattern and to assure that signal levels during recalibration are far above thermal noise levels to permit accurate relative phase and amplitude measurements. Only after the antenna pattern is synthesized is it reasonable to introduce the path losses of the radar range equation.

SUMMARY OF THE INVENTION

The present invention is an apparatus for simulating the effectiveness of an ECM technique, such as Cross Eye, against a radar system, typically a monopulse radar. This simulator operates in real time using a computer to simulate a conventional monopulse transmitter and receiver where the invention consists of supplying the necessary circuitry to integrate the ECM into the radar simulation.

An object of this invention is to test the effectiveness of an ECM technique, such as Cross Eye, without flight testing or without an anechoic chamber.

Another object of this invention is to test the effectiveness of an ECM technique, such as Cross Eye, in which the phase and amplitude precision requires a simulation technique that can perform equally precise measurements and effectiveness testing.

According to the invention, the signals from an ECM source pass through an ECM interface circuit and into a phase critical paths circuit. A simulated radar transmitter outputs an RF signal which also passes into the phase critical paths circuit. The phase critical paths circuit splits the radar signal into two distinct paths, applies the ECM signal, calibrates all components for phase and amplitude balance, and down converts the radar frequency to an intermediate frequency before it passes the signal to the calibration circuit. The calibration circuit performs the calibration after every pulse repetition interval and sends the signal to the antenna synthesis circuit where the antenna pattern is simulated. Following the antenna, an injection network preconditions and up converts the frequency of the signal prior to sending it to the radar receiver for final signal processing.

BRIEF DESCRIPTION OF THE DRAWINGS

FIG. 4 is a schematic and functional block diagram of an embodiment of the interface of an ECM jammer to the simulated radar system;

FIGS. 6A, 6B, and 6C are schematic and functional block diagrams of alternate embodiments of phase critical paths of a radar system when integrated with a Cross Eye ECM technique;

FIGS. 7A and 7B are schematic and functional block diagrams of alternate embodiments of the calibration circuitry;

FIG. 8 is a schematic and functional block diagram of an embodiment representing a monopulse antenna pattern.

DETAILED DESCRIPTION OF THE INVENTION

Figure 1:
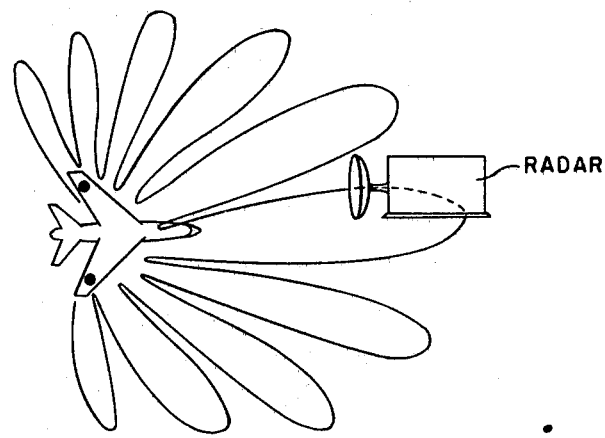
FIG. 1 is a simplified conceptual drawing of the radiation pattern generated by the Cross Eye ECM technique when properly positioned against a target radar's antenna.

The basic Cross Eye ECM technique, as shown in FIG. 1, is described in the background.

Figure 2:
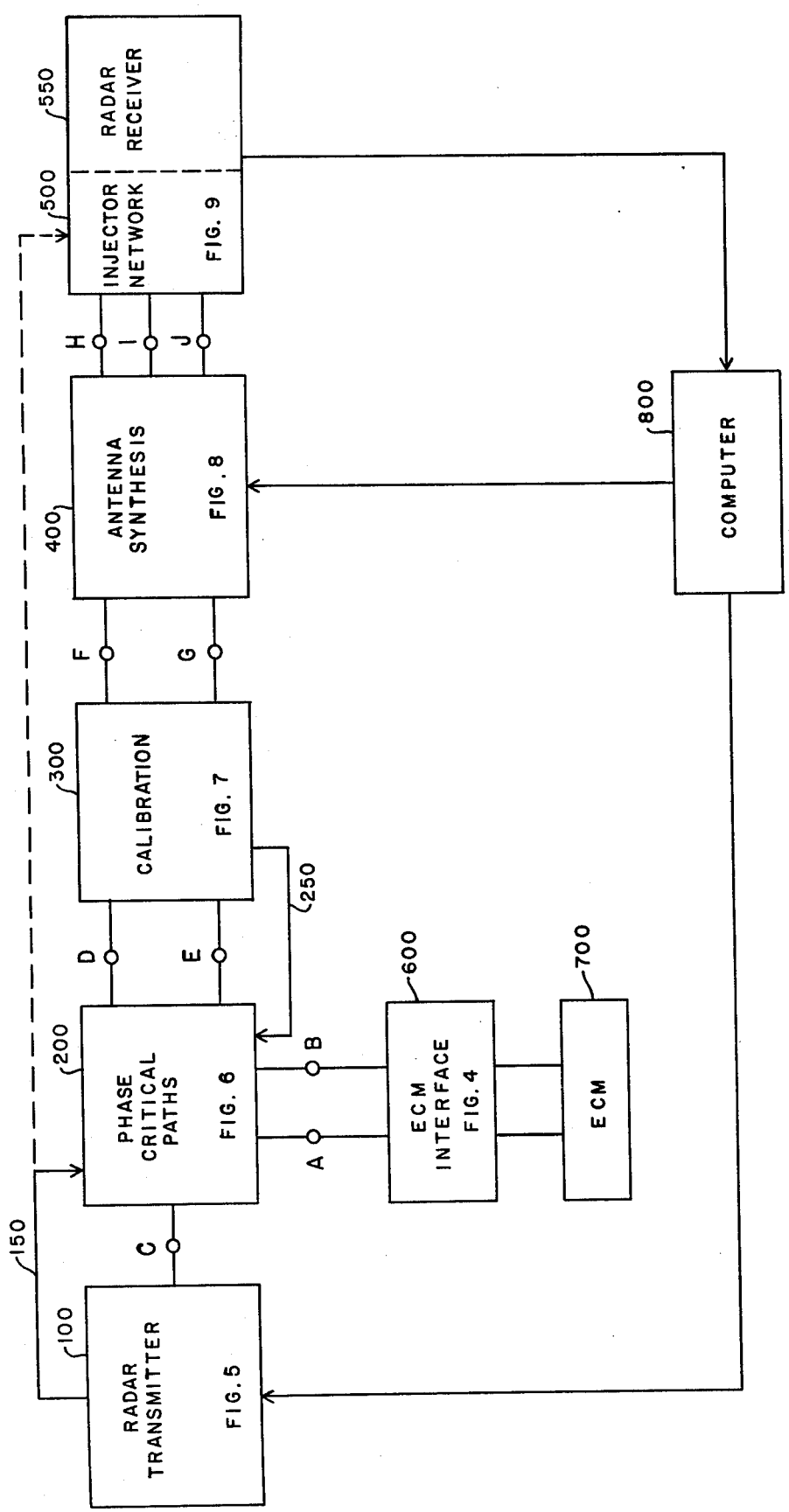
FIG. 2 is a block diagram of a simulated radar system utilizing the preferred embodiments.

FIG. 2 shows a block diagram of the Cross Eye ECM technique simulation system. The radar transmit signal is generated in circuit 100 indicating a simulated radar transmitter or "to ECM" signal. All the parameters of the radar and the effects of the radar range equation are modeled in circuit 100. This circuit outputs the radar's RF frequency to port C, provides automatic frequency control (AFC), and also outputs a local oscillator signal through line 150.

The signal at port C is fed into circuit 200, where phase critical paths are identified to correspond to the phase sensitive Cross Eye technique. Circuit 200 separates the signal from port C into two paths for eventual transmission to an ECM 700. Each path represents a signal line to and from each of the two jamming antennas required to simulate the Cross Eye technique. This is the only portion of the system in which phase errors will occur and careful matching of the components is required. After the signals have been received back from the ECM, they are then down converted to an intermediate frequency (IF) and passed to ports D and E for further processing.

The signals from the phase critical paths 200 that go to and from the ECM pass through ports A and B to an ECM interface 600. Because ECM power is very high (1KW typically), loads are placed in the ECM interface to keep the output power in the region of 1 to 10 watts. The ECM interface also controls ECM antenna gain and relative phase. In addition, the ECM interface contains a calibration PIN or "CAL PIN" diode. When the radar is blanked at the end of a pulse repetition interval and calibration of the system is initiated, the "CAL PIN" isolates the ECM from the rest of the system. This prevents the ECM from receiving additional Cross Eye information and also prevents noise from the ECM from contaminating the calibration procedure.

The signals at ports D and E are sent to a calibration circuit 300, which is a conventional phase measurement device. As mentioned earlier, during the end of a pulse repetition interval there is a time of 10 to 20 microseconds for the calibration to be accomplished. Since phase errors arise slowly compared to a pulse repetition interval, many (i.e. 100 or more) calibration pulses may be integrated to provide a fine phase adjustment. The output signals present at ports F and G are properly calibrated in phase and amplitude.

The signals at ports F and G are used as inputs to an antenna synthesis network 400 corresponding to the radar receiver's antenna pattern. Proper antenna parameters are provided by a computer 800. The antenna simulated in the present configuration is a four horn monopulse device in which the antenna patterns are adjusted for proper amplitude and phase and are then combined. For the network utilized, sum and difference patterns are generated as this technique is the most common of all monopulse systems. However, some antennas generate sum plus difference patterns and sum minus difference patterns for processing. Such changes can be accomplished quite easily by adding components to the network. The output ports H, I, and J contain the signals generated from the sum and difference techniques utilized in representing the antenna.

The signals at ports H, I, and J are fed into an injection network 500 for preconditioning the signals prior to their being processed by the connected conventional radar receiver 550. The injection network provides the proper range attenuation and target echo. In addition, up conversion of the intermediate frequency to the radar's RF frequency is generally accomplished, depending upon the radar receiver utilized.

All components in the simulation are under the control of computer 800 which controls such parameters as proper power levels, pulse timing, antenna gain and phase. For this purpose the use of multiple small computers is generally preferred since calibration control, ECM interface phase control, and receive antenna pattern gain control require fast update.

All microwave components involved in testing a jamming technique constitute an RF head. In FIG. 2, the Cross Eye RF head consists of all components shown except for the computer, radar receiver and ECM.

Figure 3A:
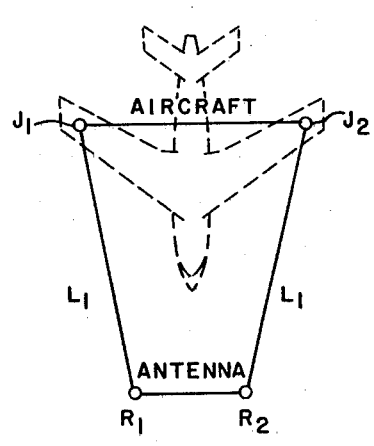
FIG. 3 is a flight geometry diagram showing the idealized and the realistic flight profiles that must be simulated.
Figure 3B:
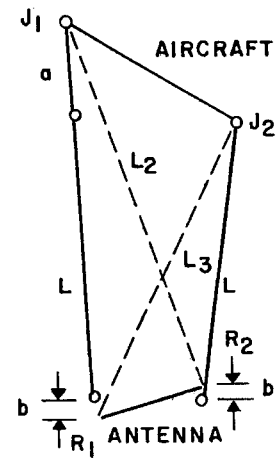

Referring to FIG. 3, a flight geometry diagram is shown. This geometry explains which paths require precise amplitude and phase control and which do not. FIG. 3A shows the basic geometry and FIG. 3B shows the necessary corrections that must be provided in the simulation. In FIG. 3A, the two jamming antennas form a line that is exactly parallel with the radar tracking antenna and the radar is assumed to be tracking the aircraft with no angular error at all. This is an idealized, unrealistic case, although it is highly significant because it represents the calibration point. The terms $J_1$ and $J_2$ refer to the jamming antennas and the terms $R_1$ and $R_2$ refer to the individual horns of a monopulse antenna. The distance L from the radar to the aircraft must be considered random for phase control purposes. It should be kept in mind that the wavelength at a nominal frequency of 10 GHz is only 0.1 foot. (A nominal value of L is 10 miles.) Aircraft velocity is not so precise for the path length L to be a major simulation for phase control. In FIG. 3B, a distance "a" is added to the distance from radar horn $R_1$ to jammer antenna $J_1$. This extends the discussion to realistic flight profiles, but temporarily the radar is assumed to provide perfect tracking. The simulation of distance "a" does not require absolute phase accuracy (and it has negligible effect on amplitude), but it does require proper phase shift rates. Some rates are caused by vibration of the aircraft as a response to a degree of turbulence. (One wavelength $\approx 0.1$ foot or $0.1° = 8.3$ microns at 10 GHz.) Another significant rate term is caused by geometry. Consider this example: If $J_1$ and $J_2$ are separated by 100 feet at 10 GHz, this corresponds to 1000 wavelengths separation. Assuming that the aircraft moves from long range (where "a" is small) to broadside (where "a" equals 100 feet) in 100 seconds, the average change in "a" is 1 ft/second or 10 wavelengths/second or 3600° phase shift/second. Inside a nominal radar pulse repetition interval of 1 millisecond, phase has shifted 3.6° on the average. Hence, it is established that absolute phase is noncritical on paths "a" and "L" but that rate changes on "a" are important on a pulse-to-pulse basis. Although these absolute lengths may be highly important to the jammer (in theory), they are not controllable in the real world.

In FIG. 3A, the transmit distance from the radar to the jammer antennas, $J_1$ and $J_2$, is equal. In FIG. B, the distance differential is caused by the rotation of the aircraft and provides the jammer with its estimate of "a" and, therefore, its precise estimate of radar location for positioning the interferometer null. Rotations in the radar antenna away from ideal boresight tracking do not cause significant changes in the estimate of "a" or proper jamming phase. The significance of this is that the transmit phase can be arbitrarily selected in the simulator for calibration purposes so long as the effects of "a" and "L" are introduced at different points.

On the return path from jamming antennas $J_1$ and $J_2$ to the radar horns $R_1$ and $R_2$, rotation of the radar antenna is highly significant. It is from this rotation that a tracking radar derives tracking error signals. When $a = 0$, rotation of the radar antenna will cause $b \neq 0$ and, therefore, $L_2 \neq L_3$. This causes a phase shift which is not available with precision at the jammer but must be simulated with precision.

FIG. 4 shows an embodiment of the interface of a jammer to the simulated radar system. In this configuration, the signal from an ECM source 700 is split into separate paths, each of which is coupled through a load 410 to a variable phase shifter 420, variable attenuator 430, and "CAL PIN" (calibration PIN) diode 440, and then to input/output ports A and B. Practical design considerations limit the loads to nominally 30 db which, in turn, means that high power devices must be used. The nominal power handling capability must be in the neighborhood of 10 watts.

This interface is not phase critical so long as the paths provide the same phase in sending a signal to the ECM as when the signal is received from the ECM. More precisely, it is sufficient in all cases to guarantee that the phase shift from port A to port B is the same as from port B to port A whenever the ECM is replaced by a short. These represent paths "L" and "a" except for range attenuation. Antenna gains $G_{J1}$ and $G_{J2}$ on the jammer are introduced in the variable attenuators. Rate changes of phase are introduced by the phase shifters.

A key component in each channel of this circuit is identified as the "CAL PIN" which is connected to a calibrate enable device 450 which removes the ECM interface during calibration of the system. Hence, during calibration there is no false radar signal sent to the jammer and there is no jamming signal to contaminate the calibration process. Attenuation can be included in the "CAL PIN", between the A and B connections and the actual switching device, to prevent contamination of phase error.

A PIN diode is a two terminal semiconductor device with Positive, Intrinsic, and Negative doping regions which has good linearity at the RF frequency range of interest when forward biased and exhibits high impedance toward the RF signal when reversed biased. PIN diodes can be used as variable attenuation devices or as switches. Both applications are used in this apparatus. It is to be understood that the PIN blocks of the drawings also contain drivers and RF-DC isolation circuits.

Figure 5:
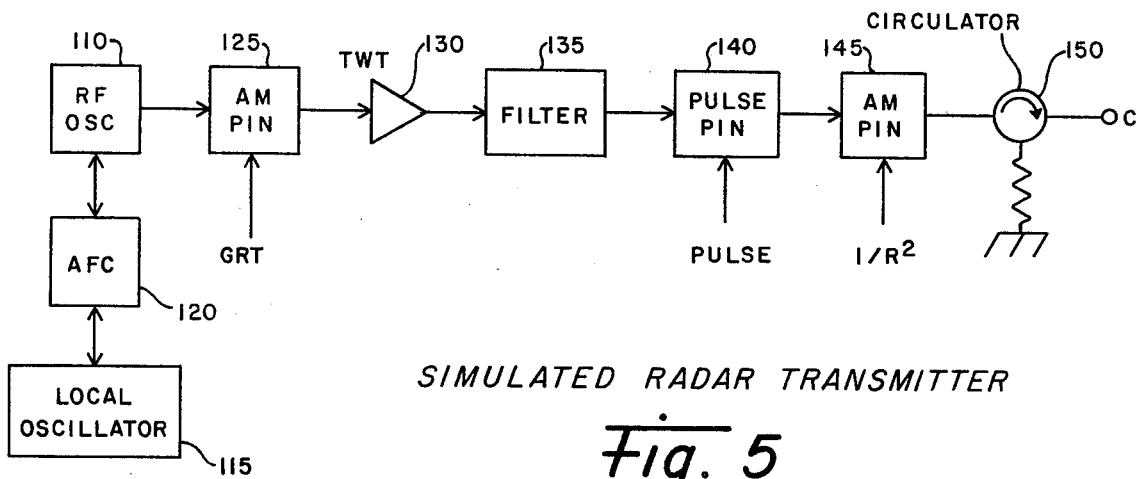
FIG. 5 is a simplified functional block diagram of a simulated radar transmitter.

FIG. 5 demonstrates a typical simulated radar transmitter or "to ECM" path designed for high power outputs. A radio frequency (RF) oscillator 110 provides the signal source for the radar. A local oscillator 115 is coupled through an automatic frequency control (AFC) 120 to the RF oscillator to assure that the local oscillator provides the proper frequency output. The RF oscillator output feeds an amplitude modulated PIN diode attenuator 125. The signal from this diode is then amplified by a traveling wave tube (TWT) 130 and, if necessary, filtered by filter 135 to reduce noise. Pulses are applied to the output signal of the filter by a pulse PIN modulator (fast switch) diode 140 with this output signal fed to a final amplitude modulated (AM) PIN diode 145 for correct amplitude control. Both the pulse and AM PIN diodes must operate at a relatively high power level, nominally 10 watts. Harmonic filtering could be installed after the AM PIN if required. The output signal of the AM PIN diode is connected to a circulator (or isolator) 150 which limits the amount of jamming that might unintentionally flow into a connected output port C and introduce unwanted effects on the AM PIN diode. All diodes receive control inputs from the computer. Port C contains the true radar frequency.

FIG. 6A shows the basic phase critical paths. In this figure, ports A and B represent the interface to and from the jammer. A is a path to and from one of the jamming antennas and B is a path to and from the other jamming antenna. Port C is the signal from the simulated radar transmitter. Ports D and E are intermediate frequency outputs of the ECM, representing the two individual jammer outputs. The outputs of the jammer at points A and B flow into separate channels, each of which contain a circulator 210 and a load 215 to ensure that very little energy is fed back to mutually connected port C. The load reduces the normally high power level (i.e., 1–10 watts) to a more suitable level for down conversion (i.e., −10 dbm to 0 dbm). A filter 220 is provided in each channel following the load to reject image frequency. Following the load, each channel contains a mixer 225 to mix the signal within each channel with the signal from a single local oscillator 115, which can be the oscillator located in transmitter 100 connected by line 150. Also, the mixer immediately down converts the signal frequency to a convenient intermediate frequency at which phase control is much less critical and passes this signal to output ports D and E. Typically, such a reduction of frequency would be 100:1 or more. Note that passive components are utilized in this circuit and that the dynamic range on the mixer should be held to the minimum possible level. Furthermore, the minimum realistic attenuation is maintained to keep signal-to-noise level high.

Calibration is accomplished just prior to radar main bang. There is a time interval available (nominally 20 microseconds) that is not displayed on a radar. During this interval the calibration PINs (FIG. 4) are turned off and a signal is sent to port C. A portion of this signal (nominally 20 db down) is available through the circulators, loads, etc., on down to ports D and E. Calibration is accomplished at an intermediate frequency and corrections are made at an intermediate frequency on ports D and E so that the signal is adjusted for a known phase condition output for a known calibration phase input. The phase critical paths have been isolated to the point where the calibration signal splits from port C to the circulators and from the point that the local oscillator output splits and feeds the mixers. The remaining parts of the paths receive pulse-to-pulse recalibration. The only critical components are the mixers, whose dynamic input range has been limited.

The high power levels relate to the isolation of the circulators. The basic requirement for high power levels stems from the necessity of providing proper signal levels to the jammer itself. In FIG. 6A, a degree of attenuation is provided from port C to the respective loads, nominally 20 db. The greater the load attenuation in FIG. 4, the higher the "to ECM" power level must be. However, this increases the amount of "to ECM" energy that can pass through the circulators in FIG. 6A and interferes with the jamming. Manipulating the radar range equation and requiring that the proper signal level is provided to the jammer, the unwanted feedthrough can be shown to be:

$$\frac{J}{S_I} = \frac{1}{L^2} \frac{4\pi\sigma}{G_{JT}G_{JR}\lambda^2} \frac{J}{S}$$

where:
$S_I$ = interfering signal (i.e., "to ECM" energy that appears in the "from ECM" path)
I = circulation isolation
L = loss between port A or port B and the jammer
$G_{JT}$ = jammer transmit antenna gain
$G_{JR}$ = jammer receive antenna gain
$\sigma$ = cross-sectional area of target
$\lambda$ = wavelength
J = jammer power
S = radar signal power Using $J/S_I$ = 30 db, J/S = 20 db, $\sigma$ = 10 dbsm, $\lambda^2$ = −30 db (relative to a square meter), I = 20 db and $G_{JR} = G_{JT} = 0$ db, the equation can be solved for the value of L. Under such conditions, L = 30.5 db. Here, I is the attenuation from port C to the load on the phase critical path and L is the load attenuation in the interface. Thus, the value of L demonstrates that the size of the load can be reasonable.

An improved calibration embodiment is reflected in FIG. 6B. A phase shifter 235 is introduced into each channel of FIG. 6A after the load and before the filter to adjust coarse phase. Two benefits occur: One is that the path errors that remain can be eliminated by shifting radio frequency during calibration, provided that phase error detection is sufficiently sensitive. Another stems from a more subtle problem: phase shifts involve time delays. Shifts at an intermediate frequency can cause a significant time discrepancy when antenna patterns are synthesized. This can provide a significant, unwanted degree of pulse noncoincidence. Coarse phase adjustment at the radio frequency corrects the problem.

Another alternative calibration embodiment is shown in FIG. 6C. A pulse PIN diode 240 is inserted into each channel of FIG. 6B before the circulator and after port C. In addition to the benefits described for FIG. 6B, the design allows for path length delays to the ECM to be simulated independently.

FIG. 7A shows typical equipment necessary to accomplish phase calibration. All phase shifters can be made to great accuracy as the intermediate frequency (IF) can be established precisely and because the wavelength is long. (At a typical 30 MHz IF for simulation, the wavelength is 10 meters. Hence, 1 cm = 0.36°.) In FIG. 7A, the line from port D to port F contains a variable phase shifter 310 followed by a variable attenuator 315. The line from port E to port G contains a fixed phase shifter 320 followed by a fixed attenuator 325. A 90° phase shifter 330 and a mixer 335 are coupled (shown at 350) and 351 between the corresponding lines following the attenuators. A 180° phase shifter 340 and a mixer 345 are connected into the same coupling devices. Since at the IF frequency the lines to ports F and G may be simple wires, the coupling devices 350 and 351 may be simply direct connections to the wires with suitable resistors as shown. The mixer connected to the 90° phase shifter serves as an indicator for proper phase control, while the mixer connected to the 180° phase shifter provides proper amplitude control. Phase and amplitude balance is accomplished between ports D and F. The nominal fixed amplitude attenuation provides a reference so that the variable attenuator can provide deviations in terms of both higher and lower attenuation. Operationally, proper phase calibration is accomplished when mixer 335 senses a need for a phase correction and adjusts the coarse phase setting of phase shifter 235 and the fine phase of phase shifter 310. Proper amplitude calibration is accomplished when mixer 345 senses a need for an amplitude correction and adjusts the variable attenuator 315 for proper amplitude. Both amplitude and phase control adjustments are performed by means of a servomechanism network coupled between the mixers and the associated components. The coarse phase adjustment signal line is shown in FIG. 2 as signal path 250. The servomechanism for amplitude control is shown in FIG. 7A as a block 346 with the amplitude null signal from mixer 345 as an input, and having an output to control the resistance 315. The block 346 may comprise an operational amplifier with suitable feedback and bias connections. The resistance 315 may be any of many known variable resistance devices such as a transistor, FET, or PIN diode, with a circuit providing a control to vary the resistance. A PIN diode should include a current driver in the control circuit to adjust a D.C. current level through the diode.

The servomechanism for phase control requires dividing the phase null signal for course and fine adjustments. This may be accomplished with analog circuits, but a more convenient way is to first convert the phase null signal to digital form, using an A/D converter 336 as shown in FIG. 7A. Then the most significant bits can be used for course phase adjustment via line 250 to the phase shifters 235 in FIG. 6B or 6C; and the least significant bits can be used to control the fine phase adjustment at the phase shifter 31. There are well known ways to provide a variable phase in response to a control signal. One way is to use a delay line arrangement with binary sections, such as is shown in U.S. Pat. No. 4,346,315 to Roberts, which is controlled by digital signals. Another way is to use a circuit which includes a varacter diode, which could be controlled by converting the digital signals to analog signals, preferably using a separate D/A converter for each of the two phase shifters 235, using the same bits as inputs, and a third D/A converter from the least significant bits for the fine phase shifter 315.

The servomechanisms 386 and 387 shown in FIG. 7B for amplitude and phase control may be similar to the circuits shown in FIG. 7A.

FIG. 7B shows a calibration approach to compensate for time lag problems which would compliment the design shown in FIG. 6B. In FIG. 7B, the line from port D to port F contains a switching network of fixed, coarse, precision phase shifters 360 followed by a variable attenuator 365 and variable fine phase shifter 370. The line from port E to port G contains a fixed attenuator 375 followed by a fixed phase shifter 380. An amplitude and phase balance control 385 is coupled 390 between the lines following both phase shifters. Conceptually, a one wavelength tapped delay line could be used, provided measurements were made often enough to identify phase shifts caused by thermal expansion. The actual values would be stored in digital equipment. Operationally, when computation shows that a major phase needs to be introduced for antenna pattern synthesis, the RF coarse phase adjustment of FIG. 6B provides a fixed, imprecisely known phase compensation. Coarse phase provides a fixed additional compensation during calibration which brings the range of fine phase adjustment to a reasonable value (i.e., approximately ±5°). Fine phase adjustment completes the calibration and since both coarse phase and fine phase are known precisely, the precise RF phase shift is known. During reception of jamming signals, coarse phase is bypassed and the necessary fine phase adjustments are made during antenna pattern synthesis. Depending upon the number of coarse phase shifts available, any degree of pulse overlap can be achieved. The degree of overlap needed depends on the bandwidth of the receiver that follows. A good rough estimate of the requirement would imply a delay of less than 5% of pulse width. To establish the rough requirement in better detail, consider a 1.0 microsecond pulse for which a 5.0 nanosecond failure to overlap is permitted. (Here, the overlap is 40 db down.) A coarse phase shift of 360° from port D to port F of FIG. 7B requires 33.3 nanoseconds time delay if the IF is 30 MHz. A total of seven coarse phase adjustments would solve the problem. An additional advantage of the FIG. 7B refinement is that differential time delays from the two jammer antennas can be introduced.

Referring to FIG. 8, a synthesis of an antenna pattern is shown. This pattern corresponds to an antenna normally associated with the radar receiver and, in this particular case, a monopulse radar antenna pattern synthesis is shown. (Other antenna patterns can also be synthesized.) In FIG. 8, ports F and G contain the ECM signals associated with each jamming antenna. Each signal is split into four channels, with each channel containing a variable attenuator 410 followed by an adjustable phase shifter 420 for simulating the proper antenna gain and phase found on each of the four horns that constitute a monopulse antenna. Following the phase shifters is a network 430 of adders and subtractors, designated by a plus or minus sign in the center of a circle. These adders and subtractors can be either op-amps or transformers and are arranged in such a manner so as to simulate the corresponding operation of magic T's utilized in a monopulse antenna. In FIG. 8, fine detail phase and amplitude control is generated to represent the voltage input in the magic T's for addition and subtraction. The functions of addition and subtraction are assumed to be completed with high isolation among input ports. The amplitude controls do not require precise level as much as they do require precise match (horn equivalent to corresponding horn equivalent) between jamming channel input F and channel G. Simulation of a four-horn monopulse antenna requires three operations: summing the simulated output of all four horns which provides the radar with range tracking and phase sensing information; summing the output of the left pair of horns, the right pair of horns, and computing the difference between the two pair to produce the change in target azimuth signal; summing the output for the top pair of horns, the bottom pair of horns, and computing the difference between the two pairs to produce the change in target elevation signal. Since the four horns receive ECM signals from the two jamming sources, the three operations must be performed for each jamming channel. The individual outputs for each jamming channel representing each of the operations are then added respectively resulting in a net antenna pattern with a three-signal output, designated as ports H, I, and J. Port H contains the summation of signals generated in all four horns by both ECM sources and is used for range and phase information. Port I contains the signal representing the change in target azimuth created by the signal difference between the left and right pairs of horns. Port J contains the signal representing the change in target elevation created by the signal difference between the top and bottom pair of horns.

Figure 9:
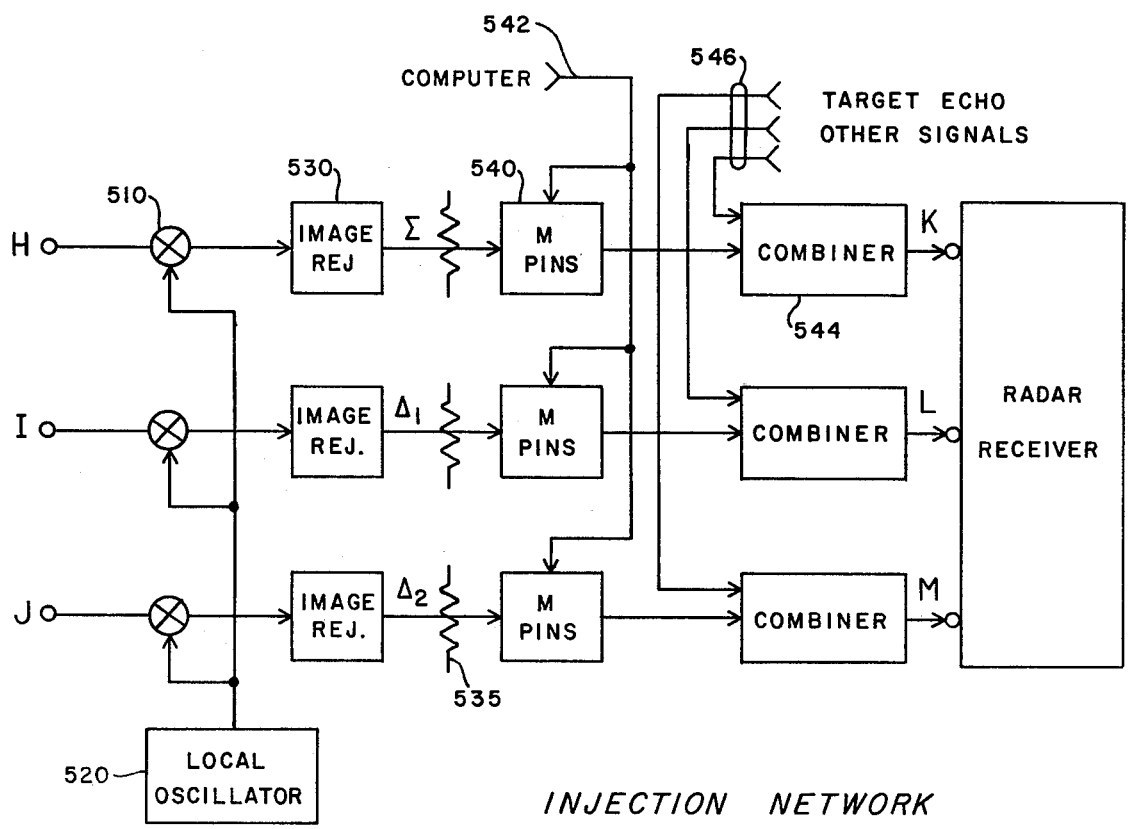
FIG. 9 is a functional block diagram of an embodiment representing an injection network for interfacing with a radar receiver.

In FIG. 9, the signals at ports H, I, and J are fed through an injection network for preconditioning prior to being injected as inputs to a radar network. Each of the signals at ports H, I, and J is fed into a mixer 510 which mixes the signal with a local oscillator 520 and upconverts the IF frequency to RF frequency. Each RF signal then passes through a bandpass filter 530 to obtain the proper frequency and perform image rejection. Following the filter, the signal then passes through an attenuator 535 to degrade the signal-to-noise ratio and then through a monopulse PIN modulator 540 for maintaining the phase shift within ±20°-30°. The monopulse PIN also receives an input 542 from the computer containing proper signal levels and range attenuation. The output of each of the monopulse PINS is fed into a combiner 544 which combines the RF signal with the target echo 546 and other optional signals. These optional signals typically would include such items as a clutter generator or a multiple aircraft scenario. The outputs of each of the combiners contain the RF signals that are ready to be injected into the monopulse radar receiver. These output signals are located at ports K, L, and M and have the same aspect functions (i.e., azimuth and elevation) respectively, as ports H, I, and J. The signals at ports K, L, and M are then injected into the monopulse radar receiver, usually at the traveling wave tube (TWT) input to complete the system, allowing the receiver to perform its function of gathering data and transmitting it to the computer.

All components of the simulation are under the control of the computer 800. It can be either a large, general purpose computer or a series of small computers. The computer is responsible for providing: (a) proper power level and adjustments to all components, (b) generating the ECM technique (i.e. Cross Eye) critical parameters for evaluation, (c) controlling flight positioning during the simulation exercise, and (d) performing general computational and data gathering services. The computer must provide proper parameters corresponding to the simulated radar transmitter and receiver as well as radar antenna patterns. In addition, the computer solves the radar range equation and adjusts power levels by controlling voltages on PIN diode modulators. For the Cross Eye technique, the computer provides relative phase to the two ECM antennas and detailed radar receive antenna pattern information with very fine grain measurements. The gain and phase of the ECM antennas are the same for transmit and receive, simplifying the modeling involved. Typical of the items that the computer maintains are radar power, radar transmit and receive antenna gain, radar cross section, antenna patterns, range parameters, ECM power, ECM antenna gain, line losses, aircraft and radar positioning, and atmospheric attenuation.

Thus, while preferred constructional features of the invention are embodied in the structure illustrated herein, it is to be understood that changes and variations may be made by the skilled in the art without departing from spirit and scope of the invention.

I claim:

1. A simulation apparatus for simulating an ECM technique having a plurality of ECM sources, against a radar system, said simulation apparatus comprising:
   a source of RF energy representing a radar transmitter; means for splitting said energy into a plurality of parallel signal paths corresponding to the number of ECM sources;
   each signal path comprising means for combining the radar signal with an ECM signal from one ECM source; mixer means to down convert the combined radar-ECM RF signal to an intermediate frequency signal; calibration means to calibrate said combined radar-ECM signal with respect to the other parallel signal paths after every radar pulse repetition interval for phase and amplitude balance; means for receiving a radar signal; and means for synthesizing a radar receive antenna pattern at an intermediate frequency coupled between the calibration means and the means for receiving a radar signal.

2. The apparatus of claim 1, wherein said means for combining the radar signal with an ECM signal from one ECM source includes means for splitting the signal from said one ECM source into separate ECM signal paths; an interface circuit connected to said separate ECM signal paths for introducing ECM antenna gains and rate changes of phase; and switching means to effectively disconnect said ECM source and ECM interface circuit during calibration processing.

3. The apparatus of claim 1, wherein said means for synthesizing a radar receive antenna pattern at an intermediate frequency includes means, in each signal path, to represent antenna gain and phase of a four horn monopulse radar receive antenna; a plurality of sum and difference circuits representing an operational network of magic T components utilized in said monopulse radar receive antenna; and means for combining said plurality of sum and difference circuits from the separate signal paths into a set of resultant signals.

4. The apparatus of claim 3, wherein said means for receiving a radar signal is a radar receiver; an injection network coupled between said means for synthesizing an antenna pattern and said radar receiver for up converting said intermediate frequency to an RF signal; and means for combining said RF signal with other components of the received signal.

* * * * *